UNITED STATES PATENT OFFICE.

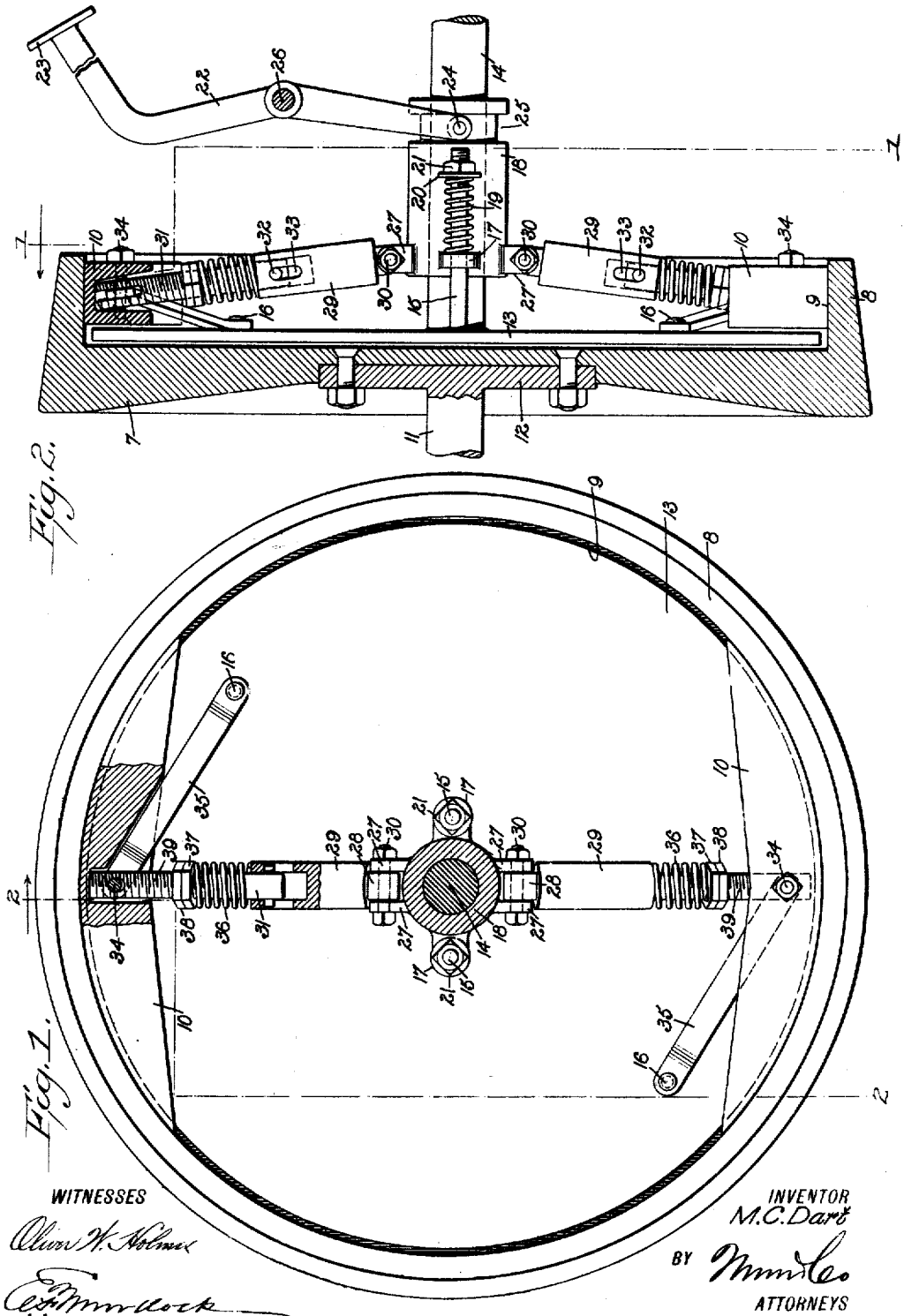

MELVIN CURTISS DART, OF NEW YORK, N. Y.

CLUTCH.

1,267,190.  Specification of Letters Patent.  Patented May 21, 1918.

Application filed February 5, 1917. Serial No. 146,626.

*To all whom it may concern:*

Be it known that I, MELVIN C. DART, a citizen of the United States, and a resident of the city of New York, borough of the Bronx, in the county of Bronx and State of New York, have invented a new and Improved Clutch, of which the following is a full, clear, and exact description.

Among the principal objects which the present invention has in view are: to avoid shocks when coupling power mechanism with transmission mechanism; to automatically release the transmission mechanism from adjacent parts of the driving mechanism under certain pre-arranged conditions; to provide a simple and effective slipping clutch; to equip an apparatus of the character mentioned with means for adjusting and varying the working conditions thereof; and to provide means for compensating for the disalinement of transmission and driving elements when operatively connected by said clutch.

*Drawings.*

Figure 1 is a transverse section showing a clutch constructed and arranged in accordance with the present invention, part of the mechanism being cut away to show the internal construction of the adjacent mechanism for regulating the spring-clutching tension, the section being taken as on the line 1—1 in Fig. 2;

Fig. 2 is a longitudinal section, the section being taken as on the line 2—2 in Fig. 1.

*Description.*

One of the members forming the clutch shown in the drawings, is a dished fly-wheel 7. The fly-wheel 7 has an extended flange 8, the inner surface 9 whereof is machined to form a friction surface for gripping shoes 10. The fly-wheel 7 is permanently mounted on a driving or crank shaft 11, said shaft being provided with a bolting flange 12 for holding the fly-wheel 7 concentric to said shaft.

A disk 13 is rigidly mounted on a transmission shaft 14. The face of the disk 13 is held adjacent the inner face of the fly-wheel 7 and preferably parallel thereto. The purpose in employing the disk 13 in the present construction, is to form a support for the bolts 15 and studs 16.

The bolts 15 are threaded through lugs 17 extended as best seen in Fig. 1 of the drawings, from opposite sides of the clutch actuating collar 18. The collar 18 is normally moved toward the disk 13 and fly-wheel 7 by two spiral springs 19, one of which surrounds each of the bolts 15. The springs 19 rest between the lugs 17 and washers 20. The washers 20 are held in adjusted positions on the bolts 15 by means of screw nuts 21 supplied for this purpose.

The collar 18 is manually moved away from the disk 13 and fly-wheel 7 by a foot lever 22 when pressure is applied to the foot pad 23 at the free end thereof. The opposite end of said lever is operatively connected with the collar 18 by pins 24 which extend into a groove 25. The lever 22 is of conventional form and is pivoted upon a shaft 26 in the usual manner for levers of this character. The collar 18 has a series of lugs 27, between which extend reduced ends 28 of tubes 29. The tubes 29 are pivotally connected with the lugs 27 by means of bolts 30.

The tubes 29 form housings for the plungers 31. The plungers 31 are supplied with pins 32 laterally extended through slots 33 formed in the sides of the tubes 29. The extended ends of the plungers 31 pivotally engage bolts 34. The bolts 34 form a pivotal connection between the said plungers 31 and the gripping shoes 10. The bolts 34 also form pivots for the free ends of the strap rods 35. The said straps operatively connect the shoes 10 and the disk 13.

The plungers 31 are normally extended by springs 36. The normal tension of the springs 36 is regulated by nuts 37 and jam nuts 38. The nuts 37 and 38 are mounted in threaded sections 39 at the ends of the plungers 31.

The mounting of the plungers 31 and parts associated therewith connecting the same to the collar 18, is such as to provide sufficient play or flexibility as will permit the construction to yield or bend to such a degree as to offer no resistance to the movement of the shoes 10 when the same are pressed against the flange 8 of the fly wheel 7. By this arrangement, provision is made that the pulling strain on the disk 13 is imparted thereto solely through the rods 35.

The clutch is operated when in service by means similar to that employed for operating clutches of conventional construction. In service, the clutch collar 18 is moved toward the disk 13 by the springs 19 which press on the lugs 17 of the said collar. The shoes 10 are pressed against the inner surface of the flange 8 gripping the same.

When it is desired to release the clutch, the operator presses his foot on the pad 23 to rock the lever 22 and move the collar 18 backward from the disk 13.

When the shoes 10 engage the flange 8, the disk 13 and shaft 14 connected therewith rotates in unison with the fly-wheel 7 and shaft 11. The pull of the fly-wheel is imparted to the disk 13 by means of the rods 35.

If the engagement of the shoes 10 with the fly-wheel 7 is too rapid, the bars 35 operate to draw the said shoes from their engagement with the flange 8. To accomplish this purpose, the studs 16 are disposed on the disk 13 at points closer to the center of said disk and of the fly-wheel 7 than the normal service relation of the bolts 34 in the shoes 10. The immediate result of this arrangement is that the pulling strain exerted by the fly-wheel 7 on the disk 13 and parts connected therewith through said strap rods 35, if greater than calculated, operates to retract the plungers 31 and shoes 10 sufficient to permit the said shoes to release the wheel 7. It is obvious that the movements of the shoes 10 and the plungers 31 connected therewith are slight, and that immediately the pull on the rods 35 is relieved, the said springs operate to reëngage the shoes 10 and the flange 8.

By adjusting the nuts 37 and 38, the pressure of the springs 36 may be so regulated as to obtain any required hold or grip of the shoes 10 on the flange 8. It is obvious that this tension may be varied to obtain any required sensitiveness in the action of the clutch.

*Claim.*

A clutch comprising two rotary members co-axially related, one of said members having an extended internal friction flange, and the other of said members having a disk disposed within said flange and in a plane parallel with the plane of said first-mentioned member; a plurality of friction shoes adapted to engage said flange; link members connecting said disk and said shoes, said members constituting means for imparting movement to said disk and load carried thereby, the pivotal connections of said link with said disk being closer the center of said disk than the connections of said link members with said shoes, whereby the pull of the shoes on the disk is translated to a contracting effect on said shoes; and manually operated means for moving said shoes for gripping said flange, said means having provision for rotary movement of said shoes with said flange independently of said disk.

MELVIN CURTISS DART.

Copies of this patent may be obtained for five cents each, by addressing the "Commissioner of Patents, Washington, D. C."